Jan. 22, 1952     A. H. LAIDIG ET AL     2,583,431
MANUFACTURE OF GLASS TUBING AND CANE
Filed Feb. 18, 1942     4 Sheets—Sheet 1
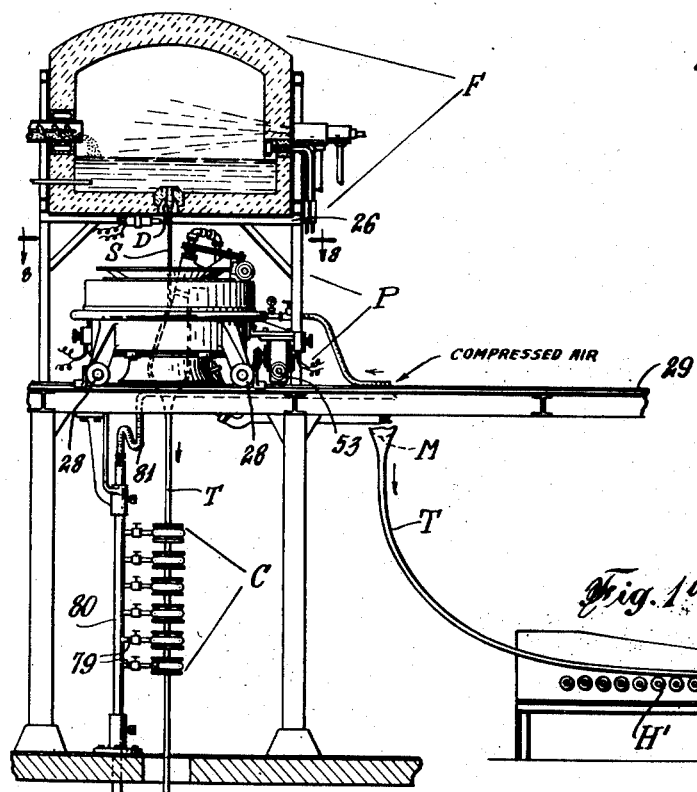
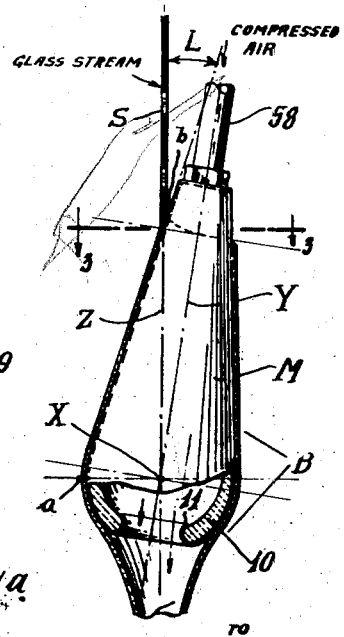
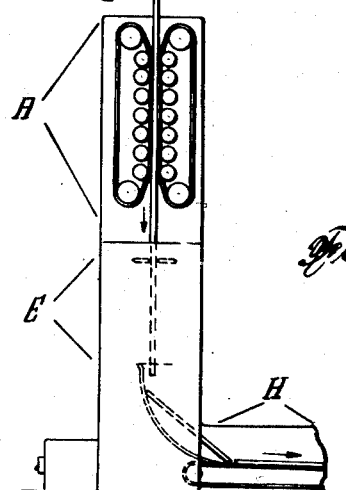
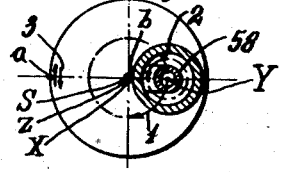
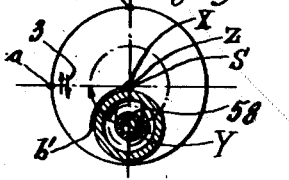
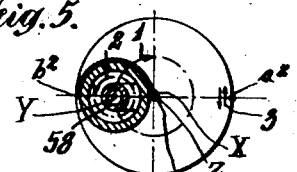
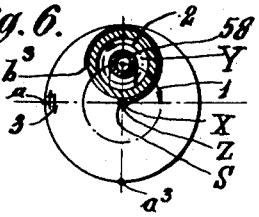
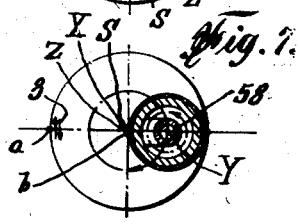
INVENTORS
A. H. Laidig
H. K. Richardson
BY
ATTORNEY

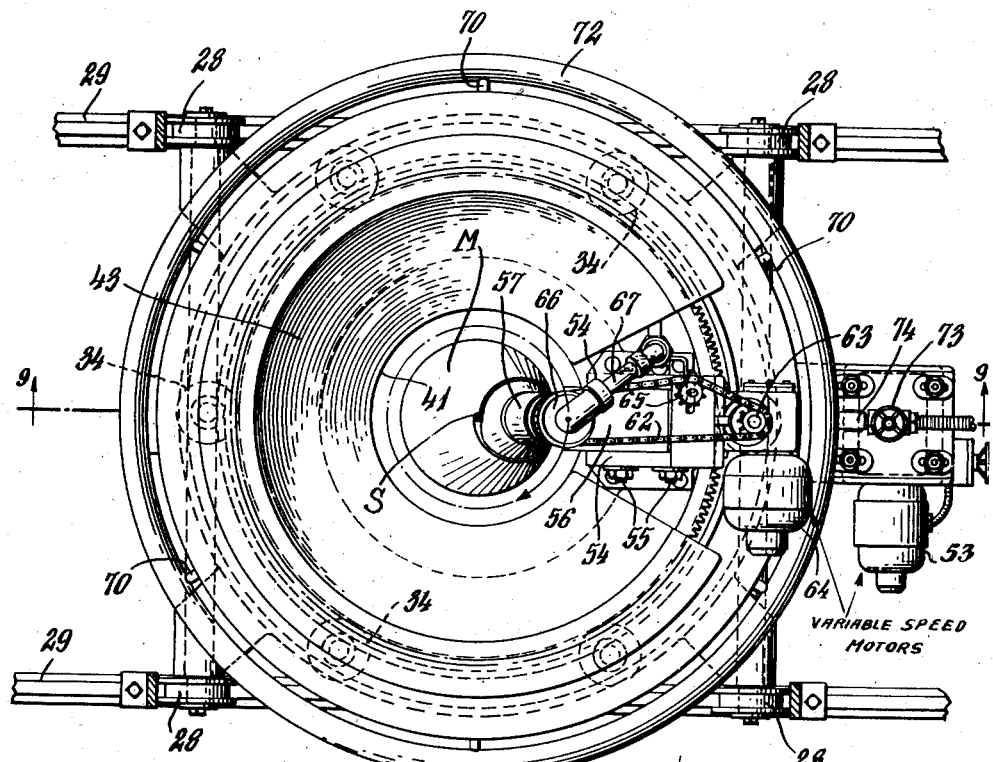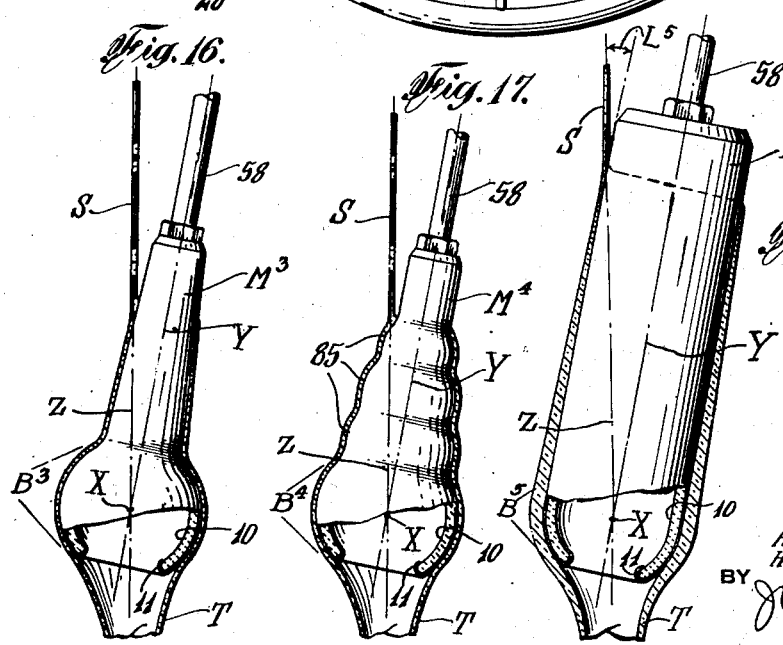

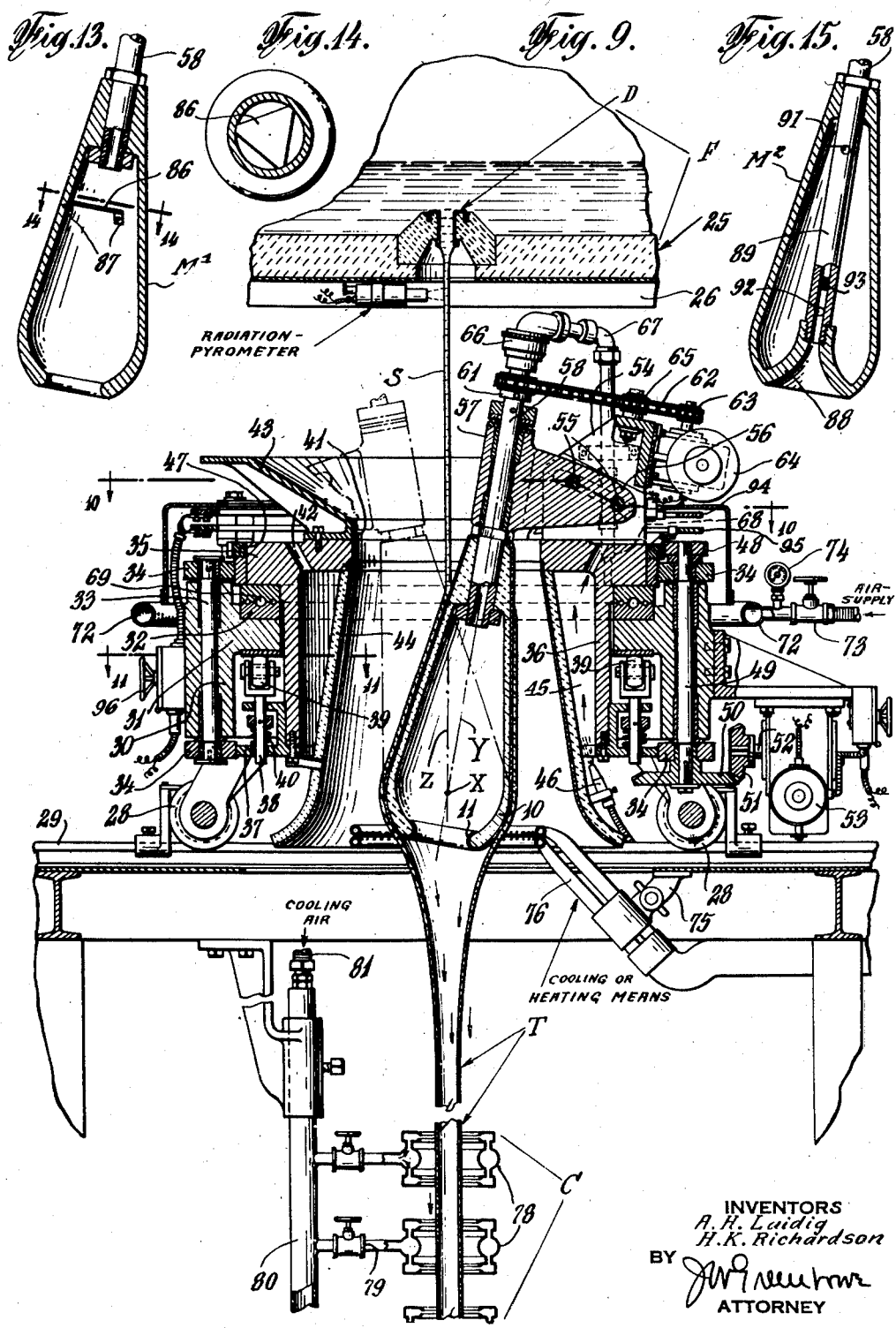

INVENTORS
A. H. Laidig
H. K. Richardson
BY
ATTORNEY

Patented Jan. 22, 1952

2,583,431

UNITED STATES PATENT OFFICE 2,583,431

MANUFACTURE OF GLASS TUBING AND CANE

Alfred H. Laidig and Henry K. Richardson, Bloomfield, N. J., assignors to Westinghouse Electric Corporation, East Pittsburgh, Pa., a corporation of Pennsylvania Application February 18, 1942, Serial No. 431,378

14 Claims. (Cl. 49—17.1)

This invention relates to improvements in glass working, and more particularly to apparatus by which glass may be taken from a glass melting unit in a highly fluid state and formed into tubing or cane in a rapid and continuous operation.

In the ordinary methods of fabricating glass articles heretofore employed, glass-making constituents have been melted and then subjected to an elevated temperature to drive off any occluded or trapped gases. This phase of glass melting is known as fining, and the glass in this condition is extremely fluid so that it is very difficult to handle and control by the commonly known glass fabricating methods. As a consequence, it has heretofore been the common practice to introduce the fined glass into a part of the melting unit which was held at a lower temperature so that its viscosity was increased before the glass was removed from the furnace for fabrication into ware. Such a temperature reducing procedure has been absolutely essential in the manufacture of glass ware by time-honored methods, as in hand fabrication, it was common practice to gather the fluid, but relatively highly viscous glass, on the end of a blowpipe or pontil and then transfer it to a mould and shape it while it still retained some of its initial heat. Methods of fabricating glass heretofore have been based on the handling of the glass while at temperature below the fining temperature, and therefore in a higher state of viscosity than that of the glass at its fining temperature.

Heretofore in the art it has been proposed to form extended lengths of glass tubing directly from molten glass by flowing the glass onto the surface of a rotating hollow cylindrical mandrel sustained at an angle to the vertical and provided with a substantially conical shaped discharge end portion having an axially located opening therein to permit the egress of air under pressure from the interior. Rotary motion is imparted from the mandrel to the viscous glass flowing in a tubular stream thereover and in order to substantially prevent spiralling of the tubular walls of the glass tubing drawn vertically downward therefrom, the said tubing must be rotated in the direction of mandrel rotation at a rate relative to the rate of mandrel rotation effective to neutralize or overcome the spiralling motion imparted by the axially rotating mandrel.

The primary object of the present invention is the rapid fabrication of finished glass tubing or cane from a body of molten glass without subjecting it to a temperature reduction within the melting unit.

Another object of the invention is to provide means for eliminating the rotary motion at the point of discharge of the viscous glass stream from the end of the rotating mandrel.

A further object is to provide means for drawing glass tubes substantially free from spiralling defects.

A still further object is to provide an improved tube forming mandrel and an improved means including said mandrel for forming extended lengths of glass tubing directly from molten glass.

Still another object is to facilitate the manufacture of extended lengths of glass tubing.

In accordance with these objects we have discovered that by providing the rotatable cylindrical mandrel, heretofore employed in the art, with a substantially spherical discharge end, instead of with the conically-shaped end as heretofore provided, and by sustaining the mandrel with its axis at an angle to the vertical, to be planetarily revolved about a vertical axis running through the center of said spherical end in a direction opposite to the direction of rotation, and at a rate of planetary revolution approximating that of rotation, the motions of planetary revolution and rotation imparted to the mandrel surface in a horizontal plane passing approximately through the point of intersection of the two axes are effectively neutralized, and extended lengths of glass tubing may be drawn vertically downward from the said spherical mandrel end substantially free from rotative motion.

In accordance with this discovery we have designed glass tube drawing means, illustrated in the accompanying drawings, wherein:

Fig. 1 is a side elevational view, partly in section, illustrating the general assembly of elements involved in the practice of the present invention;

Fig. 1ª is a fragmentary side elevational view of part of the assembly of Fig. 1, showing a modification;

Fig. 2 is an enlarged view, partly in section, of the improved mandrel means;

Figs. 3 to 7, inclusive, are cross-sectional views on the plane 3—3 of Fig. 2, in the direction of the arrows, illustrating successive operational positions of the mandrel of Fig. 2;

Fig. 8 is an enlarged plan view on the plane 8—8 of Fig. 1, in the direction of the arrows, illustrating the mandrel means and associated apparatus embodying the invention;

Fig. 9 is an enlarged vertical sectional view on the plane 9—9 of Fig. 8, in the direction of the arrows, to illustrate the apparatus more particularly;

Fig. 13 is an axial sectional view of a modification of the improved mandrel means of the present invention;

Fig. 14 is a transverse sectional view on the plane 14—14 of Fig. 13, in the direction of the arrows;

Fig. 15 is an axial sectional view of a second modification of the improved mandrel;

Figs. 16, 17 and 18 are side views illustrating further modifications of the improved mandrel.

Figure 10:
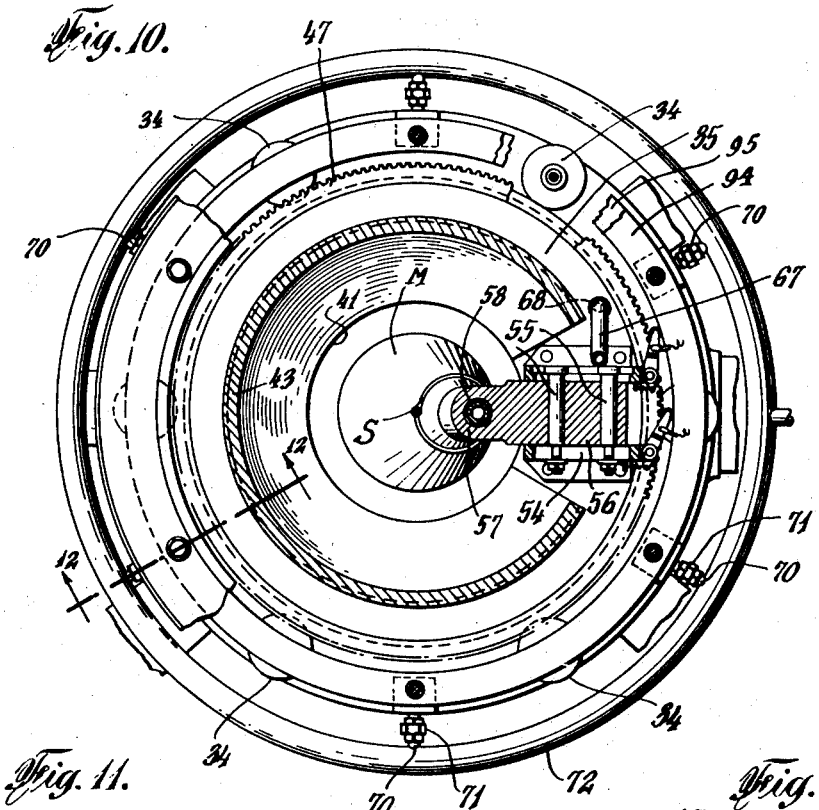
Fig. 10 is a horizontal sectional view on the plane 10—10 of Fig. 9, in the direction of the arrows.
Figure 11:
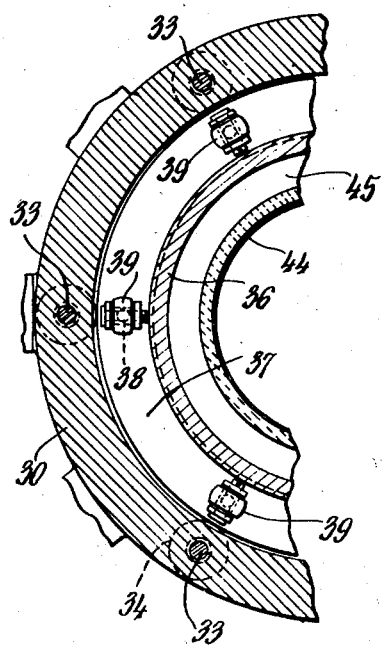
Fig. 11 is a fragmentary horizontal sectional view on the plane 11—11 of Fig. 9, in the direction of the arrows.

The present invention, in its most generic aspects, contemplates the flowing of an accurately-gaged thin cylindrical glass stream, that is, one not hollow and of substantially constant cross-section; said stream having a predetermined temperature, and uniform rate of flow; vertically downward upon the surface of an elongated air-cooled hollow mandrel, circular in section and provided with a substantially spherical discharge end, which mandrel is mounted at an angle to the vertical, with the spherical end located at a lower level than the opposite end, arranged to be planetarily revolved about a vertical axis passing through the center of the said spherical end portion, and simultaneously rotated about its longitudinal axis. The planetary revolution and axial rotation are related so as to maintain the surface of the spherical mandrel end portion, at the level of the point of intersection of the axes of planetary revolution and mandrel rotation, substantially in a fixed or non-rotating relationship to the tubular glass stream flowing downwardly thereover. By appropriate selection of mandrel length and diameter, with respect to the mandrel cooling rate, the temperature of the glass as it passes in a tubular stream from the mandrel end may be regulated to any desired temperature suitable for drawing.

With this arrangement, the tubular glass stream falling vertically downward from the spherical end of the mandrel may be cooled to its solidification temperature, and the solidified glass tube formed may be engaged by drawing means which moves it downward at a rate relative to the rate of flow of the glass stream over the spherical end, so as to place the glass under a desired drawing tension and obtain glass tubing of the desired diameter and wall thicknes. Preferably the glass stream is cooled relatively rapidly to the solidification temperature by means located at a level intermediate the mandrel end and the said drawing means, as soon as possible after the desired tube diameter and wall thickness is obtained.

Referring to the drawings in detail, the arrangement shown in Figs. 1 to 12, inclusive comprises furnace means generally indicated by letter F and supported on a frame structure 26 to produce a flowing stream S consisting of molten glass of a desired composition, such for example, as lead or lime glass; tube forming means indicated generally by the letter P, with supporting wheels 28 carried on rails 29 and conically shaped or frusto-conical mandrel means M provided with a substantially spherical end B, or one formed as a spherical segment from its plane of union with the frusto-conical portion, mounted with its longitudinal axis Y at an acute angle to the vertical or line Z of the stream S, and with the center X of the spherical end portion B located in alignment with the vertical axis Z at a level below that of the opposite end of the mandrel M. The mandrel is mounted so as to be planetarily revolved in one direction about the vertical axis Z and simultaneously rotated in the opposite direction about its axis Y. Cooling means indicated generally by the letter C is disposed concentrically about the vertical axis Z below the spherical end B of mandrel M, so that the glass cane or tube T from mandrel M passes therethrough, and in which the temperature of the glass T is lowered to that at least approximating its solidification temperature. Means indicated generally by the letter A are located on opposite sides of axis Z at a level below that of means C to engage the glass T as it leaves cooling means C and move it downward with its axis substantially in vertical alignment with axis Z at a predetermined rate relative to the rate of flow of the glass over the spherical end B of mandrel M, to maintain the viscous glass at the level of planetary rotation under a drawing tension to produce the desired diameter (and wall thickness if tubing is being drawn).

Means E is provided to periodically cut cane or tube T into desired lengths as means A moves it thereto. Conveyer means H is provided to transport the cut lengths of glass to storage or selecting means (not shown) as heretofore customary in the art.

It is essential to the practice of the present invention to provide a stream S of molten glass which is characterized by a substantially constant cross-sectional area and rate of flow (or volume) at the desired temperature. The means indicated generally by letter F is designed to accomplish this result and preferably includes a means such as described and claimed in the Whitmore et al application, Serial No. 399,652, filed June 25, 1941, for Glass Furnace Charging, and owned by the assignee of the present application, for maintaining the level of liquid glass in the furnace, a platinum-rhodium die D such as described and claimed in the Richardson patent, No. 2,190,296, dated February 13, 1940, and a radiation pyrometer sighted on the glass stream and other apparatus of the type described and claimed in Richardson patent, No. 2,116,450, issued May 3, 1938. The apparatus of said prior cases, as forming no part of the present invention, except insofar as associated with the means M, P, C, A, and/or E, as hereinabove described, need not here be more specifically described.

It should be recognized that whereas mandrel M is shown to be substantially conical in shape, its specific size, shape and configuration may be widely modified without essential departure from the present invention, as one skilled in the art will readily recognize.

The mandrel M is desirably an elongated hollow body circular in cross-section and provided with a substantially spherical end portion B and an opposite generally conical or cylindrical end portion, with air outlet and inlet openings respectively in the said ends. The length and diameter of the mandrel M, from one end to the other, depends primarily upon the extent of cooling desired during the time interval the molten glass is flowing thereover. Where the temperature differential between the desired drawing temperature of glass tube T as it leaves the spherical end B of mandrel M, at about the level of center X, and the temperature of stream S as it falls on mandrel M is relatively small, the mandrel length and diameter may be materially different from the mandrel length and diameter when the temperature differential of the glass is relatively high. In general, the diameter of tube to be drawn from the mandrel end is affected by the diameter of mandrel M at the spherical end, although with any given spherical diameter a plurality of diameters in tube T may be obtained by varying the drawing tension applied by means A.

With any given ratio between the diameters of the top and bottom ends of mandrel M, the length may be selected with respect to any given volume of glass of any given composition to obtain any desired cooling or temperature differential between stream S and cane or tube T at the point of discharge from the mandrel M.

Preferably mandrel M is formed of a body part 10, consisting of suitable refractory material, and surfaced exteriorly with a relatively thin sheath 11 of glass-resistant material such as platinum-rhodium alloy described and claimed in the Richardson patent, No. 2,190,296, of February 13, 1940, or one of the well known chromium-nickel or chromium-iron alloys. Alternatively mandrel M may be formed entirely of metal, without departure from the present invention.

Figs. 3 to 7, inclusive, illustrate the successive positions of mandrel M at the end of each 90° of planetary revolution and axial rotation and demonstrate the relation between the rates of rotation to obtain the desired result, namely, effective neutralization of the planetary and rotary motions of mandrel M, at the level of glass discharge from the spherical end.

Upon planetary revolution of mandrel M about the vertical axis Z, the longitudinal axis Y of the mandrel, at the level of plane 3—3, follows a path indicated by dot-dash circle and arrow 1, with the result that any given point $a$ on the surface of spherical end B at the level of center X would tend to move successively to points $a^1$, $a^2$, $a^3$, and back to position $a$ during one complete cycle of planetary revolution, whereas point $b$ where axis Z intersects the surface of mandrel M would tend to stay at said axis. Any other point on the surface of the spherical end B would tend to rotate about axis Z in substantially the same manner as hereinabove described for point $a$.

However, by also rotating mandrel M about its longitudinal axis Y in a direction opposite to that planetary revolution, as indicated by arrow 2, point $b$ will be moved successively to positions $b^1$, $b^2$, $b^3$, and back to point $b$, while point $a$, when the rates of planetary revolution and axial rotation are exactly equal will be restrained from any movement in the direction of arrow 1 as indicated by double arrows 3. Any other point on the surface of spherical end B will be similarly restrained from rotative movement as described for point $a$.

For any given length of mandrel M and given ratio between the diameters of spherical end B and its opposite conical or cylindrical end, the angular displacement between axes Z and Y may be varied over a range of acute angles to adjust the tube forming means, to any given conditions of glass temperature or glass volume in streams S, and means to so adjust the angle of inclination of axis Y to axis Z are provided in the assembly generally indicated by letter P, in addition to the means to mount the mandrel M to be planetarily revolvable and axially rotatable, simultaneously in opposition, about the axis Z and the axis Y, respectively.

The arrangement of the specific embodiment illustrated in the drawings is that designed for the formation of extended lengths of tubing from glass of compositions customarily employed in the lamp and radio tube industry, and with a mandrel of 30″ conical length and a diameter varying between 5″ and 15″. The usual drawing temperature of this glass composition at end of mandrel nose varies from about 810° to 860° C. for lead or lime glass.

Formulae for glass which is contemplated for use in practicing our inventions, are as follows:

| | Per cent |
|---|---|
| Silica | 55.5 |
| PbO | 30.0 |
| $Na_2O$ and $K_2O$ | 13.0 |
| $Al_2O_3$ and $Fe_2O_3$ | 1.5 |
| | 100.0 |

| | Per cent |
|---|---|
| Silica | 72.5 |
| CaO and MgO | 9.5 |
| $Na_2O$ and $K_2O$ | 16.5 |
| $Al_2O_3$ and $Fe_2O_3$ | 1.5 |
| | 100.0 |

As indicated in the drawings (Figs. 1 and 9), a glass discharge opening in the die D is provided in the bottom of furnace F, the diameter of said opening being such as to provide for the production of a stream of molten glass S of desired diameter. Automatic control of furnace temperature and fluid glass level within furnace F operates to maintain the stream S under a substantially constant head at a predetermined temperature approximating 1100° to 1300° C.

The tube forming means P of the present invention includes the mandrel M and means to mount the mandrel M at an angle to the vertical to be planetarily revolved about a vertical axis Z passing through the center of spherical end B and axially rotated about its longitudinal axis Y. It may be widely varied without departure from the present invention as one skilled in the art will perceive. In the specific embodiment shown, it is mounted on wheels 28 for movement on rails 29, comprises a substantially tubular frame 30 having at a point between its upper and lower ends an inwardly extending flange 31 which carries on its upper face an anti-friction bearing 32. Mounted in the frame 30, at spaced intervals around its periphery, are shafts 33, which project above and below the upper and lower ends of the frame 30, to form journals for guide rollers 34. Supported by the anti-friction bearing 32 is a rotatable member 35 which is provided with a depending cylindrical sleeve 36, carrying at its lower end outwardly extending substantially U-shaped brackets 37, the arms of which are pierced to receive spindles 38, which are bifurcated at their upper ends to receive guide rollers 39. The rollers 39 are forced upwardly against the under side of the flange 31 by suitable resilient means such as coil springs 40. Formed concentrically with the sleeve 36 of the rotatable member 35 is an opening 41. At spaced intervals in the rotatable member 35, between its periphery and the opening 41, is a plurality of spaced air ducts 42.

Secured to the upper face of the rotatable member 35 is a substantially funnel-shaped element 43 which serves as a shield to protect the apparatus therebeneath from the excessive heat of the glass and furnace F. Depending from the underside of the rotatable member 35 and extending beyond the lower end of the sleeve 36 is a refractory sleeve 44 of substantially frusto-conical shape which forms a chamber 45 which is open at its lower end and communicates with the openings 42 at its upper end. An air blast nozzle 46 is mounted on the lower end of the refractory sleeve 44 so that air under pressure may be admitted to the chamber 45 in order to effect a cooling of the refractory wall and a consequent reduction of temperature of the glass passing through the opening defined by the sleeve 44, thus providing a viscosity control therefor.

Secured to the rotatable member 35 is a ring gear 47 which meshes with a pinion 48, which in turn is keyed to a shaft 49 carrying at its lower end a bevel gear 50 which in turn meshes with a bevel pinion 51 mounted on a shaft 52 driven by a suitable power source such as a variable speed motor 53. Thus, it will be seen that when the motor 53 is operated the member 35 will be caused to rotate, carrying with it the refractory sleeve 44. Carried by funnel-shaped element 43, and extending toward its center, are brackets 54 slotted to receive bolts 55 which extend through and support a bracket 56 which carries at its free end a sleeve 57 receiving a tubular shaft 58 upon which the glass support or mandrel M is mounted.

The mandrel M, which in the specific embodiment illustrated is for use with lead or lime glass initially at relatively high temperatures (from 1100° to 1300° C.), comprises a hollow frusto-conical refractory body 10 having a rounded end B, and the small end portion of which is secured to the lower end of the tubular shaft 58. In a preferred form, the mandrel tapers from a relatively large lower end approximating 15 inches in diameter, where tubing of .045" to .055" wall thickness and approximately 2⅛ inches in outside diameter is to be drawn, to a diameter equal to substantially one-third of its largest diameter, with an overall length approximating 34 inches. As hereinabove noted, the mandrel M desirably consists of a body portion 10 of refractory material, such as alumina or clay, as commonly employed in the glass industry, exteriorly surfaced with a relatively thin sheath of a metallic alloy, consisting of 90% platinum and 10% rhodium. While it is desirable that the mandrel be covered with such a refractory metal, it is not in all cases absolutely essential, and we contemplate the use of a refractory mandrel without such a metallic coating.

Rotation of the mandrel M is effected by means of sprocket 61 secured to the upper end of the shaft 58, and connected by a chain 62 to a sprocket 63 driven by a variable speed and reversible motor 64, receiving power as it planetarily revolves with the mandrel M as from slip rings 94 and 95 connected through controller 96 to a suitable source, it being understood that a suitable tightening sprocket 65 may be employed to adjust the chain.

Figure 12:
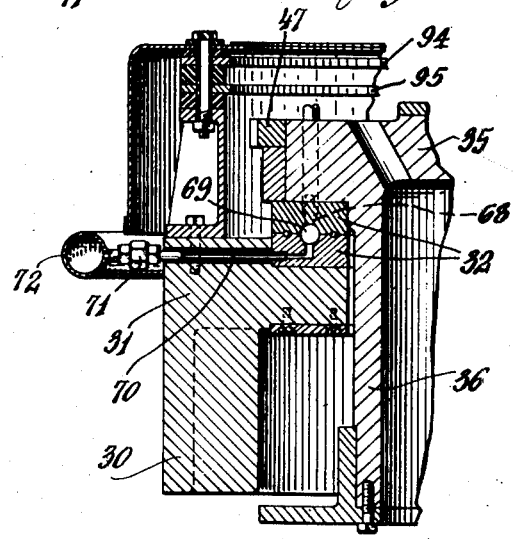
Fig. 12 is a fragmentary vertical sectional view on the plane 12—12 of Fig. 10, in the direction of the arrows.

Secured to the upper end of the shaft 58 is a stuffing box 66 which is, in turn, connected by a suitable piping arrangement 67 to a passage 68 formed in the rotatable member 35. This passage communicates with a passage 69 defined by elements of the anti-friction bearing 32. (Fig. 12.) Air under pressure is admitted to the passage 69 through a plurality of radial passages 70 and couplings 71 from a circular manifold 72 which surrounds the apparatus and is connected through a valve 73 to a suitable source of air supply (not shown). A pressure gauge 74 is mounted between the valve and the manifold so that the pressure of the air entering the system may be known at all times.

Adjustably mounted on a suitable bracket 75 is a device like a ring burner 76 by which a flame or blast of air may be directed against the lower end B of the mandrel M, whereby a regulated heating or cooling effect on the glass coating of the mandrel may be attained, to thereby facilitate obtaining glass at the proper temperature for drawing.

Cooling means C comprises a plurality of spaced tubular rings 78 mounted beneath the mandrel, in spaced relation to the glass working apparatus, concentrically of axis Z, each of which rings 78 being provided with radially directed openings disposed so as to direct air under pressure against the glass T moving downward therethrough. These rings 78 are connected by means of pipes and valves 79 to a manifold 80, which is in turn connected by suitable flexible connection 81 to an air supply (not shown). By appropriate regulation of valves 79, any desired cooling rate may be effected by the means C. It is preferred to vary the air pressure in the several rings 78, so that the maximum cooling rate is provided by the upper or first ring and the minimum cooling rate by the bottom ring.

Mounted beneath the cooling means C is a suitable tractor or tube drawing means A, by means of which the formed glass tube may be drawn through cooling means C at any desired rate, with the tube T maintained on axis Z and fed to means E for cutting it into usable or desired lengths. The means, per se, and the specific manner in which it is operatively controlled is old and well known in the art and forms no part of the present invention, except in combination with the other means hereinabove described with particularity, and accordingly need not be more specifically described. Several alternative means are available in the art for performing this desired result. Tube cutting means E and conveyor means H also are each old and well known devices heretofore employed in the art, and therefore do not require detailed description.

As an alternative to the combination of means C, A, E and H, the arrangement shown in Fig. 1ᵃ may be employed, particularly in the forming of extended lengths of glass tubing of relatively small diameter. In this arrangement, the tube T is permitted to cool slowly to its solidification temperature and fall onto conveyor H', whereon it is moved to drawing and cutting means (not shown) as heretofore employed in the art. In this form it is desirable to operate the machine so as to rotate the tubing during its formation to preserve uniform distribution of the glass in the tube wall and prevent what is commonly termed "siding."

In the modification illustrated in Fig. 13, an interior baffle plate 86, consisting of a substantially triangular piece of sheet metal is secured, as at 87, in spaced relation to the point where air is admitted to the mandrel M' through the tubular shaft 58. Such an arrangement prevents a sharp blast of air from impinging upon any portion of the glass and avoids any tendency of the viscous glass flowing over the end of the mandrel to bulge or blow out.

In some instances where relatively heavy charges of glass are to be handled by the mandrel, it may be found desirable to provide the lower end of the mandrel with inturned walls 88, as shown in Fig. 15, which are connected to an extension 89 formed on the lower end of the tubular shaft 58. This structure reinforces the lower end of the mandrel $M^2$ and enables it to support heavier loads, though the cooling effect of the air on the inner walls of the mandrel is materially lessened. Holes 91, 92 and plug 93 improve air circulation therein by causing air to flow from the tubular shaft 58 out of hole 91 to the annular space between said shaft and mandrel, and then back to said shaft through hole 92.

In the modified form of mandrel $M^3$ illustrated in Fig. 16, the lower or spherical end portion $B^3$ is considerably larger in diameter than the frusto-conical portion. Such an arrangement provides for the relatively rapid cooling of relatively thick glass deposits on said mandrel, and prevents the building up of a thickened portion of glass at the lower end of the mandrel in the forming of tubes of relatively thick walls.

In some instances it may be desirable to provide the mandrel with annular ribs 85 along the mandrel $M^4$ length intermediate the large and small ends thereof as illustrated in Fig. 17, in order to retard the flow of glass as it approaches the lower spherical end $B^4$ of the mandrel, as well as to increase the cooling area thereof. Such modifications may be found desirable in handling glass of various compositions, but in general, as long as the lower end of the mandrel is substantially spherical, as illustrated in Figs. 1, 2, 9, 13 and 15, and the mandrel is mounted for planetary revolution and axial rotation, substantially as hereinabove described, satisfactory operation will be obtained.

In the embodiment of our invention illustrated in Fig. 18 the mandrel $M^5$ is generally cylindrical with a partly spherical lower end $B^5$. Such a mandrel is employed, rather than a combined frusto-conical and spherical mandrel, where it is desired to allow the glass to thicken toward the bottom as illustrated, it being obvious that in this instance the stretching effect on the glass of passing down a frusto-conical surface is absent.

In the embodiment of Fig. 18, the angle 15 of engagement between the stream of glass S and surface of the mandrel $M^5$ is smaller than the angle L between said stream and a frusto-conical mandrel such as M, where the axis Y of said mandrel is disposed at the same angle YXZ to the vertical, thereby making an arrangement somewhat more critical (compare Fig. 18 with Fig. 2). In other words, a slight variation in the position of the glass stream, as might be caused by air currents, will affect the point of engagement between said stream and the mandrel to a great extent than with the corresponding frusto-conical mandrel.

However, in some instances it might be desired to use this type of mandrel because of its greater cooling area per unit length and its greater tendency, previously mentioned, to allow the glass coating the mandrel to thicken as it approaches the lower end. Because of the increased tendency of the glass coating to thicken as it cools and approaches the lower end of the mandrel, a lesser mandrel length for obtaining a given drop in temperature would be necessary, other things being equal. It will, therefore, be seen that the cooling effect, due to greater area per unit length, may be more than compensated for by the tendency of the glass to thicken as it flows to the lower end of the mandrel.

In operation, a stream S of highly fluid glass, issuing from the outlet D in the bottom of the glass furnace 25 is intercepted by the glass support which in the present instance takes the form of the mandrel M.

In order to maintain the size of the glass stream S uniform, the outlet 91 which determines the same, is desirably formed in a die constructed of an alloy of platinum and rhodium, such as described and claimed in the Richardson patent, No. 2,190,296, previously mentioned. When used with a mandrel of the size specifically mentioned in the present application for forming glass tubing of 2⅛" outside diameter and from .045" to .055" wall thickness, the bore of said die is between 1" and 1¼" for delivering about ten pounds of lime glass per minute. The lower end of the glass support remains substantially stationary, while its upper end planetarily revolves about the axis of the glass stream so as to produce a uniform distribution of the glass on the support, as illustrated in Figs. 3 through 7 inclusive. Through the medium of the chain 62 and the driving mechanism connected therewith, it is obvious that, even though the upper end of the glass support planetarily revolves about the axis of the glass stream, a reverse axial rotation of the mandrel M maintains the rounded end of the mandrel substantially in a fixed position relative to the glass tubing T leaving the mandrel end, and consequently rotation or twisting of the glass tubing T below the mandrel M is prevented.

If the apparatus is used for drawing glass tubing vertically, no necessity for rotating the tubing during formation arises, as there is no danger of introducing "siding." On the other hand, if the tubing is to be drawn horizontally, as illustrated in Fig. 1ª, the glass support may be rotated in one or the other direction, and in that event proper distribution of glass in the wall of the tubing may be effected. By utilizing variable speed and reversible motors 53 and 64, a proper synchronization of the moving parts may be attained, and extreme flexibility of the apparatus secured.

The air (the pressure of which rarely exceeds but a few ounces) admitted to the interior of the glass flowing off of the end of the glass support may be varied by a manipulation of the valve 73, so that the walls of the tubing being formed will be supported against collapse. In some instances, it may be found that the air jet emitted from the tubular shaft 58, in order, for instance, to sustain a very thin walled tubing, may be of such velocity as to cause a bulge or a blowout at the point of impingement against the glass surface, in which event it is desirable to employ a mandrel or glass support having a baffle such as is illustrated in Figs. 13 and 14.

While the apparatus has been shown and described as particularly applicable to the fabrication of glass tubing from highly heated glass, it is believed obvious that by an appropriate design of the mandrel, the cooling surface area of the same may be varied to meet any known or desired thermal conditions, thereby adapting the device of the present invention to the forming of glass tubing from glass at any working temperature. The present invention accordingly contemplates the use of a plurality of different types of mandrels ranging from a substantially cylindrical, spherical ended mandrel, to distinctly conical or pear-shaped mandrels, depending upon the cooling conditions required to obtain glass at the proper drawing temperature at the discharge end of the mandrel, in the forming of any given size of tubing.

From the foregoing disclosure it will be seen that we have devised an apparatus with a mandrel which is shaped so that it may receive glass in a very fluid or watery condition and cool it to a working temperature, the thickness of the glass delivered from said mandrel depending on the size and shape of the latter and the rapidity of the flow of the glass thereon. The mandrel may be designed so that the glass layer retains the same thickness from top to bottom or varies in thickness in accordance with the requirements.

One of the advantages of our invention is that the glass is cooled more rapidly than before and the rate of cooling may be more accurately controlled. By virtue of using a frusto-conical or pear-shaped mandrel, the glass is spread out or stretched as it descends, making it possible to use a shorter mandrel. The glass where it engages the mandrel is cooled at a faster rate, because of the planetary revolution of the mandrel top, than near the bottom where the air circulation is not as great. This effects a quick temperature drop at the area of contact, making it possible to correspondingly shorten the mandrel, while obtaining a predetermined cooling effect, or increase the rate of glass flow when using a given mandrel, thereby obtaining a greater production.

On account of drawing the glass or cane vertically, and without net rotation of the mandrel, a more uniform product is obtained. Of course it is understood that when drawing cane, no air is blown into the mandrel to keep the glass which is drawn therefrom in a hollow condition.

Having described the present invention and given one specific embodiment thereof, with several contemplated modifications, it is believed apparent that the same may be widely varied without essential departure therefrom, and all such modifications and departures are contemplated as fall within the scope of the appended claims.

We claim:

1. Glass tube drawing apparatus comprising an elongated hollow mandrel circular in cross-section and having a substantially spherical end portion and an elongated end portion, an air outlet opening in said spherical end coaxial with the said mandrel, means to circulate air through said mandrel, means to mount said mandrel with its spherical end down and the longitudinal axis thereof at an acute angle to a vertical line through the center of said spherical end portion, means to planetarily revolve said mandrel about said vertical line, means to simultaneously rotate said mandrel about its longitudinal axis in a direction opposing the direction of planetary revolution, means to flow a stream of molten glass downward along the said vertical line from a level above the said mandrel and onto the mandrel surface, means to cool the tubular glass stream falling vertically downward from the said spherical mandrel end to its solidification temperature at a level substantially below the mandrel end, and means to engage said cooled tubular glass and move the same downwardly from said spherical end at a rate adapted to place the tubular glass stream, in the space gap between the mandrel end and said cooling means, under a drawing tension effective to form tubing of the desired diameter and wall thickness.

2. Glass tube drawing apparatus comprising an elongated hollow mandrel having an elongated body portion circular in cross-section terminating in a substantially spherical end portion of a diameter greater than the diameter of the body portion, said spherical end portion having an air outlet opening located on the longitudinal axis of the said mandrel, means to mount said mandrel with its longitudinal axis at an acute angle to the vertical and with its spherical end at a lower level than that of the opposite end of the mandrel, means to planetarily revolve the said mandrel about a vertical axis running through the center of said spherical end, means to simultaneously rotate the said mandrel about its longitudinal axis in a direction opposing the direction of planetary rotation, and at a rate of revolution effectively neutralizing planetary rotation at a level approximating the level of the center of said spherical end portion, means to flow a stream of molten glass vertically downward onto the surface of the body portion of the mandrel, means to circulate air in the interior of the mandrel and outwardly through the said outlet opening, means at a level below the horizontal level of the said spherical end of the mandrel to rapidly cool the tubular glass stream passing from the mandrel end to the temperature of solidification, and means to engage and to move downward the solidified glass tube at a rate effective to place the unsolidified tubular glass stream as it leaves the mandrel end under a desired drawing tension.

3. Glass tube drawing apparatus comprising an elongated hollow mandrel having a substantially spherical end portion and a substantially conical shaped body portion, said end portion being provided with an air outlet opening located on the axis of the said body portion, means to sustain said mandrel with its axis disposed at an acute angle to the vertical and with the spherical end portion lying at a level below the opposite end of the mandrel, means to planetarily revolve the said mandrel about a vertical axis running through the center of said spherical end portion, means to simultaneously rotate the said mandrel about its axis in a direction opposing the direction of planetary revolution, means to circulate air through the mandrel and out through the said opening, means to flow a stream of molten glass onto the surface of said conical body portion of the mandrel, means to cool the glass tube flowing vertically downward from the spherical end portion of the mandrel, and means to engage and to move downward the cooled glass tube at a controlled rate adapted to place the solidified glass tube under a drawing tension to maintain a uniform diameter and wall thickness in the said glass tubing at it is drawn off from the said spherical end portion.

4. Glass fabricating apparatus comprising an elongated support the axis of which is inclined, means to planetarily revolve said support about a vertical axis, means to simultaneously rotate it about its longitudinal axis in a direction opposite to that of said planetary revolution, means to simultaneously flow a stream of molten glass downward along said vertical axis onto the upper portion of said support, to cause glass to be deposited in a uniform layer about the periphery of the latter, means to control the viscosity of the glass as it flows toward the lower end of said support, and means to engage the glass as it passes from said support and fabricate it into finished ware.

5. Apparatus for forming cylindrical glass articles comprising an inclined mandrel, means to planetarily revolve said mandrel about a vertical axis, means to simultaneously rotate it about its longitudinal axis in a direction opposite to that of said planetary revolution, means to flow a stream of molten glass downward along said vertical axis onto the mandrel surface to cause a uniform layer of glass to be deposited thereabout, means to control the temperature of the glass as it flows down the mandrel, and means to engage and draw said glass from the lower end of said mandrel.

6. Glass tube drawing apparatus comprising an inclined mandrel, means to planetarily revolve said mandrel about a vertical axis, means to simultaneously rotate it about its longitudinal axis in a direction opposite to that of said planetary revolution, means to flow a stream of molten glass downward along said axis onto the mandrel to cause a uniform layer of glass to be deposited thereabout, means to control the temperature of the glass as it flows down the mandrel, means to engage and draw the glass from the lower end of said mandrel, and means to introduce fluid pressure into the interior of the glass for preserving a bore therein.

7. Glass tube drawing apparatus comprising an inclined mandrel, means to planetarily revolve said mandrel about a vertical axis, means to simultaneously rotate it about its longitudinal axis in a direction opposite to that of said planetary revolution, means to flow a stream of molten glass downwardly along said axis and onto the mandrel surface, means to engage and draw glass from the lower end of the mandrel, and means to introduce fluid under pressure into the glass as it passes from the lower end of said mandrel.

8. Apparatus for fabricating cylindrical glass articles comprising an inclined mandrel, means to planetarily revolve said mandrel about a vertical axis, means to simultaneously rotate it about its longitudinal axis in a direction opposite to that of said planetary revolution, means to flow a stream of molten glass downward along said vertical axis onto the upper portion of the mandrel, and means to draw glass from the lower end of said mandrel.

9. Glass tube drawing apparatus comprising an inclined elongated hollow mandrel for supporting and forming glass on its exterior surface, one end of which is substantially spherical with an axial opening therein and the opposite end elongated, with the body portion of the mandrel intermediate said ends substantially circular in cross section, means mounting said mandrel for planetary revolution of its elongated end portion about an axis through the center of its spherical end portion, means to flow a stream of molten glass downwardly along said axis and on to the mandrel surface, means to engage and draw glass from the lower end of the mandrel, and means to circulate air through said axial opening in said mandrel, and on into the glass as it passes from the lower end of said mandrel.

10. Glass tube drawing apparatus comprising an elongated hollow mandrel circular in cross-section and having a substantially spherical end portion and an elongated end portion, means to circulate air through said mandrel, means to mount said mandrel with its spherical end down and the longitudinal axis inclined to a vertical line through the center of said spherical end portion means to planetarily revolve said mandrel about said vertical line, means to simultaneously rotate said mandrel about its longitudinal axis in a direction opposing the direction of planetary revolution, means to flow a stream of molten glass downward along the said vertical line onto the mandrel surface, means to cool the tubular glass stream, and means to engage said cooled tubular glass and move the same downwardly from said spherical end.

11. Glass tube drawing apparatus comprising an elongated hollow mandrel having an elongated body portion circular in cross-section terminating in a substantially spherical end portion, said spherical end portion having an air outlet opening, means to mount said mandrel with its longitudinal axis inclined to the vertical and with its spherical end at a lower level than that of the opposite end of the mandrel, means to planetarily revolve the said mandrel about a vertical axis running through the center of said spherical end, means to simultaneously rotate the said mandrel about its longitudinal axis in a direction opposing the direction of planetary rotation, and at a rate of rotation effectively neutralizing planetary revolution at a level approximating the level of the center of said spherical end portion, means to flow a stream of molten glass vertically downward onto the surface of the body portion of the mandrel, means to circulate cooling air in the interior of the mandrel and outwardly through the said outlet opening, and means to engage and to move downward the formed glass tube.

12. Glass tube drawing apparatus comprising an elongated hollow mandrel having a substantially spherical end portion and a substantially conical shaped body portion, said end portion being provided with an air outlet opening, means to sustain said mandrel with its axis inclined to the vertical and with the spherical end portion lying at a level below the opposite end of the mandrel, means to planetarily revolve the said mandrel about a vertical axis running through the center of said spherical end portion, means to simultaneously rotate the said mandrel about its axis in a direction opposing the direction of planetary revolution, means to circulate cooling air through the mandrel and out through the said opening, means to flow a stream of molten glass onto the surface of said conical body portion of the mandrel, and means to engage and to move downward the formed glass tube.

13. In apparatus for fabricating glassware, means for holding a batch of highly-fluid molten glass, said means having a vertically arranged discharge orifice, a movable inclined glass support having an upper portion in vertical alignment with said discharge orifice so as to intercept a stream of such highly-fluid molten glass therefrom, means to planetarily revolve said support about the axis of said stream and simultaneously rotate it about its longitudinal axis in a direction opposite to that of said planetary revolution that said intercepted glass is deposited in a substantially uniform layer on the peripheral surface thereof, means operatively associated with said support for increasing the viscosity of the layer of glass deposited thereon, and means adjacent a lower portion of said support for forming said glass of increased viscosity into finished ware.

14. In apparatus for fabricating glassware, means for holding a batch of molten glass, said means having a vertically arranged discharge orifice, a movable inclined glass support having an upper portion in vertical alignment with said discharge orifice so as to intercept a stream of molten glass therefrom, means to planetarily revolve said support about the axis of said stream and simultaneously rotate it about its longitudinal axis in a direction opposite to that of said planetary revolution so that rotation of said support is neutralized at a point near its lower end where it merely oscillates and imparts no twisting motion to glass being drawn therefrom, means operatively associated with said support for increasing the viscosity of the layer of glass deposited thereon, and means adjacent a lower portion of said support for forming said glass of increased viscosity into finished ware.

ALFRED H. LAIDIG.
HENRY K. RICHARDSON.

REFERENCES CITED

The following references are of record in the file of this patent:

UNITED STATES PATENTS

| Number | Name | Date |
|---|---|---|
| 1,219,709 | Danner | Mar. 20, 1917 |
| 1,574,482 | Hirsch | Feb. 23, 1926 |
| 1,670,058 | Broche | May 15, 1928 |
| 1,743,960 | Favre | Jan. 14, 1930 |
| 1,838,162 | Soubier | Dec. 29, 1931 |
| 1,869,303 | Cardot | July 26, 1932 |
| 1,876,031 | Soubier | Sept. 6, 1932 |
| 1,926,410 | Soubier | Sept. 12, 1933 |
| 1,977,956 | Soubier | Oct. 23, 1934 |
| 2,009,793 | Sanchez-Vello | July 30, 1935 |
| 2,131,417 | Danner | Sept. 27, 1938 |
| 2,141,456 | Woods | Dec. 27, 1938 |
| 2,310,474 | Teichmann | Feb. 9, 1943 |
| 2,402,924 | Snyder | June 25, 1946 |

FOREIGN PATENTS

| Number | Country | Date |
|---|---|---|
| 693,153 | France | Aug. 18, 1930 |
| 38,432 | France | Mar. 3, 1931 |
|  | (Addition to No. 693,153) | |